US012684232B2

(12) United States Patent
Park

(10) Patent No.: US 12,684,232 B2
(45) Date of Patent: *Jul. 14, 2026

(54) METHOD FOR REDUCING CURRENT CONSUMPTION OF DRIVING VIDEO RECORDING SYSTEM IN PARKING RECORDING MODE, DRIVING VIDEO RECORDING SYSTEM AND COMPUTER-READABLE RECORDING MEDIUM

(71) Applicant: THINKWARE CORPORATION, Seongnam-si (KR)

(72) Inventor: Soon Woo Park, Seongnam-si (KR)

(73) Assignee: Thinkware Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/907,651

(22) Filed: Oct. 7, 2024

(65) Prior Publication Data

US 2025/0392809 A1    Dec. 25, 2025

(30) Foreign Application Priority Data

Oct. 6, 2023    (KR) ........................ 10-2023-0133384
Oct. 2, 2024    (KR) ........................ 10-2024-0134386

(51) Int. Cl.
*H04N 5/77*        (2006.01)
*H04N 23/65*       (2023.01)
*H04N 23/667*      (2023.01)

(52) U.S. Cl.
CPC ............. *H04N 23/651* (2023.01); *H04N 5/77* (2013.01); *H04N 23/667* (2023.01)

(58) Field of Classification Search
None
See application file for complete search history.

(56) References Cited

U.S. PATENT DOCUMENTS

| | | | |
|---|---|---|---|
| 2007/0156320 A1* | 7/2007 | Breed ................. | B60C 23/0433 |
| | | | 701/70 |
| 2015/0138001 A1* | 5/2015 | Davies ................... | G08G 1/146 |
| | | | 340/932.2 |
| 2022/0210327 A1* | 6/2022 | Kanehara ............. | G06V 10/267 |
| 2023/0188836 A1* | 6/2023 | Yuasa ................... | H04N 23/61 |
| | | | 348/148 |

* cited by examiner

*Primary Examiner* — Eileen M Adams
(74) *Attorney, Agent, or Firm* — SALIWANCHIK, LLOYD & EISENSCHENK

(57)    ABSTRACT

Disclosed is a driving video recording system. A driving video recording system includes a camera that includes a capturing unit capturing a video, an event detection sensor detecting an event, and a camera connector for interfacing with a main body, and a main body that includes an image processing unit receiving and processing an image captured by the capturing unit, a power supply unit supplying power for an operation of the driving video recording system, a control unit controlling an operation of the power supply unit, and a main body connector for interfacing with the camera. The control unit controls the power supply unit to turn off the power supply to the capturing unit in a parking recording mode and to turn on the power supply to the event detection sensor.

17 Claims, 11 Drawing Sheets

1000

METHOD FOR REDUCING CURRENT CONSUMPTION OF DRIVING VIDEO RECORDING SYSTEM IN PARKING RECORDING MODE, DRIVING VIDEO RECORDING SYSTEM AND COMPUTER-READABLE RECORDING MEDIUM

CROSS-REFERENCE TO RELATED APPLICATIONS

This application claims the benefit of Korean Application Nos. 10-2024-0134386, filed Oct. 2, 2024; and 10-2023-0133384, filed Oct. 6, 2023, the disclosure of each of which is incorporated by reference herein in its entirety.

TECHNICAL FIELD

The present disclosure relates to a technology for reducing current consumption of a driving video recording system in parking recording mode.

TECHNOLOGY BACKGROUND OF THE INVENTION

A digital video recording system (DVRS) is a product that performs a digital video recording (DVR) function required by a vehicle, and is a driving video recording system that is installed in a vehicle and records video that occurs while parked or driving.

The driving video recording system may be installed in various types of vehicles such as taxis, buses, and police cars, and may generally be configured as a camera that captures an interior and exterior of a vehicle, a memory that stores the captured video, a GPS module that records and tracks a location of the vehicle, a display that may confirm the video in real time, etc.

The driving video recording system includes a driving recording mode that is activated in a driving situation of a vehicle and records a situation that occurs while driving the vehicle, and a parking recording mode that is activated in the parking situation of the vehicle and records the situation that occurs while parking the vehicle.

Even if the driving video recording system enters the parking recording mode, the driving video recording system consumes tens of mA to hundreds of mA of current for continuous video recording. This current causes a problem in which a battery life is reduced or discharged.

To improve this problem, a technology of stopping all functions in the parking recording mode, performing only some necessary operations, and waking up all the functions to record and store video when an interrupt occurs due to sensing by an event detection sensor is being added to the driving video recording system. In this case, the event detection sensor uses a G-Sensor for external impact detection, a radar sensor for external object detection, etc., and the event detection sensor is built into a main body and thus can be easily controlled.

The event detection sensor is built into the main body or connected via a flexible printed circuit board (FPCB) or a board to board connector, so it is directly supplied with power, and the event detection sensor is assigned signal lines to detect an event and transmit an interrupt, so it can be easily controlled.

Meanwhile, when the event detection sensor is built into the camera among the main body and camera that are configured physically separately from each other, the camera receives power from the main body through a power over coax (POC) method or a power over data line (PODL) method that supplies power to a video signal line, and the power becomes the main power of the capturing unit and the event detection sensor of the camera. In this case, the camera transmits video and data to the main body through a combination (hereinafter collectively referred to as SERDES) of a serializer of the camera and a deserializer of the main body. To this end, the camera should be always be powered on.

In addition, the event detection sensor built into the camera also transmits an object detection signal to the main body through the SERDES. However, in the parking recording mode, when the event detection sensor detects an object and transmits the interrupt to the main body, the SERDES should be operating, so there is a problem that a lot of current is consumed.

CONTENTS OF THE INVENTION

Problems to be Solved

The present disclosure provides a method for minimizing current consumption in a driving video recording system including a main body and a camera having a built-in event detection sensor that are configured physically separately from each other.

Means for Solving the Problem

According to an aspect of the present disclosure, a driving video recording system includes: a camera that includes a capturing unit capturing a video, an event detection sensor detecting an event, and a camera connector for interfacing with a main body; and a main body that includes an image processing unit receiving and processing an image captured by the capturing unit, a power supply unit supplying power for an operation of the driving video recording system, a control unit controlling an operation of the power supply unit, and a main body connector for interfacing with the camera, in which the control unit controls the power supply unit to turn off the power supply to the capturing unit in a parking recording mode and to turn on the power supply to the event detection sensor.

The event detection sensor may include at least one of an impact event detection sensor and a motion event detection sensor.

The camera connector and the main body connector may be connected to each other via a cable.

The camera and the main body may be configured physically separately from each other.

A signal line of the capturing unit and a signal line of the event detection sensor may be configured separately from each other.

The power supply unit may include a first power supply unit and a second power supply unit, and the first power supply unit and the second power supply unit may receive power from a battery of a vehicle in which the driving video recording system is installed.

The camera connector may include: a first camera connector that interfaces data communication between the capturing unit and the image processing unit and interfaces power supply between the capturing unit and the first power supply unit; and a second camera connector that interfaces power supply between the event detection sensor and the second power supply unit and interfaces data communication between the event detection sensor and the control unit.

The main body connector may include: a first main body connector that interfaces data communication between the capturing unit and the image processing unit and interfaces power supply between the capturing unit and the first power supply unit; and a second main body connector that interfaces power supply between the event detection sensor and the second power supply unit and interfaces data communication between the event detection sensor and the control unit.

In the parking recording mode, the control unit may control the power supply unit to turn off the power supply through the first power supply unit and turn on the power supply through the second power supply unit, and the event detection sensor may receive power from the second power supply unit through the second camera connector of the camera connector and the second main body connector of the main body connector to operate.

The power supply of the first power supply unit to the capturing unit and the image processing unit through the first camera connector of the camera connector and the first main body connector of the main body connector may be cut off, and the capturing unit and the image processing unit may not operate.

When an event is detected by the operating event detection sensor, the event detection sensor may transmit an interrupt to the control unit through the second camera connector and the second main body connector, and the control unit receiving the interrupt may control the power supply unit to turn on the power supply through the first power supply unit.

The capturing unit and the image processing unit may be supplied with power from the first power supply unit through the first camera connector of the camera connector and the first main body connector of the main body connector, and the capturing unit and the image processing unit may wake up and operate.

When the operations of the capturing unit and the image processing unit are completed, the control unit may control the power supply unit to turn off the power supply through the first power supply unit.

According to another aspect of the present disclosure, a method for reducing current consumption of a driving video recording system, in which the driving video recording system includes a camera that includes a capturing unit capturing a driving video, a parking event detection unit detecting an event during parking, and a first connector unit for connection to a main body; and a main body that includes an image processing unit receiving and processing an image captured by the capturing unit, a power supply unit supplying power for an operation of the driving video recording system, a control unit controlling an operation of the power supply unit, and a main body connector for interfacing with the camera, the method includes: controlling the power supply unit to turn off the power supply to the capturing unit in a parking recording mode and to turn on the power supply to the event detection sensor.

The method may further include: receiving, by the first power supply unit and the second power supply unit, power from a battery of a vehicle in which the driving video recording system is installed, in which the power supply unit may include a first power supply unit and a second power supply unit.

The controlling may include controlling the power supply unit to turn off the power supply through the first power supply unit and turn on the power supply through the second power supply unit, and may further include receiving, by the event detection sensor, power from the second power supply unit through the second camera connector of the camera connector and the second main body connector of the main body connector to operate.

The method may further include: cutting off the power supply of the first power supply unit to the capturing unit and the image processing unit through the first camera connector of the camera connector and the first main body connector of the main body connector, and not operating the capturing unit and the image processing unit.

The method may further include: when an event is detected by the operating event detection sensor, transmitting, by the event detection sensor, an interrupt to the control unit through the second camera connector and the second main body connector; and controlling, by the control unit receiving the interrupt, the power supply unit to turn on the power supply through the first power supply unit.

To achieve the above object, according to an embodiment of the present disclosure, there is provided a computer-readable recording medium on which a program for executing the method for reducing current consumption of a driving video recording system described above.

To achieve the above object, according to an embodiment of the present disclosure, there is provided a computer program including a program code for executing the method for reducing current consumption of a driving video recording system.

Effects of the Invention

According to the present disclosure, the signal (power signal and data signal) line of the capturing unit that captures the video and the signal (power signal and data signal) line of the event detection sensor that detects the event in the parking recording mode may be configured separately from each other, and the control unit may control each line separately to minimize the current consumption of the driving video recording system in the parking recording mode, thereby expecting the effects of the increased recording time and increased battery life in the parking recording mode.

DETAILED DESCRIPTION

Hereinafter, various embodiments of the disclosure will be described in detail with reference to the accompanying drawings.

Figure 1:
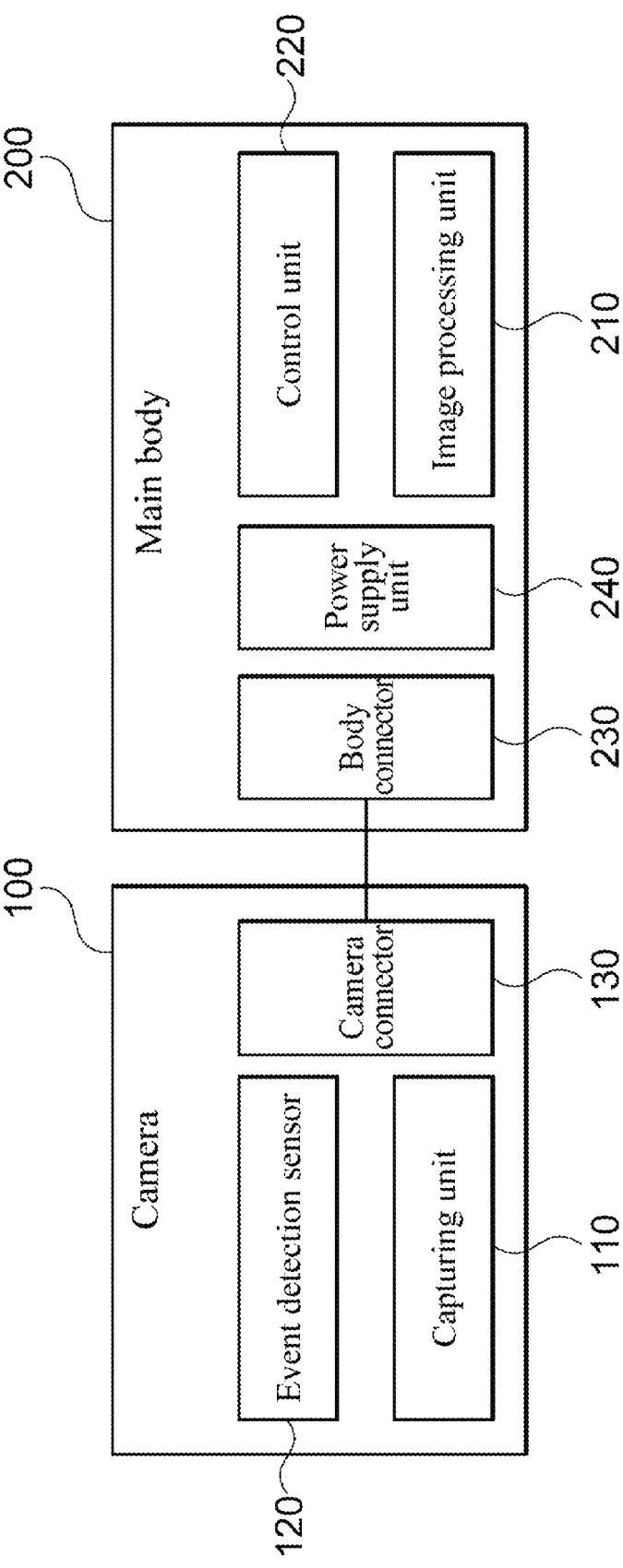
FIG. 1 is a block diagram illustrating a driving video recording system according to an embodiment of the present disclosure.

FIG. 1 is a block diagram illustrating a driving video recording system according to an embodiment of the present disclosure. Referring to FIG. 1, a driving video recording system 1000 is a system installed in a vehicle to capture video in situations such as driving, stopping, and parking of the vehicle and to store the captured video, and may include a camera 100 and a main body 200.

Here, the camera 100 and the main body 200 may be separately configured physically separated from each other.

In the present disclosure, a vehicle is an example of a moving body, and the moving body of the present disclosure is not limited to the vehicle. The moving body according to the present disclosure may include various objects that may move, such as a vehicle, a person, a bicycle, a ship, and a train. Hereinafter, for convenience of explanation, a case where the moving object is the vehicle will be described by way of example.

In addition, in the present specification, an action that triggers an operation of the driving video recording system is defined as an event. For example, the types of events may include impact events, motion events, user gesture events, user touch events, remote control command reception events, etc. Here, the driving video recording system 1000 may include all or some a front image capturing apparatus of capturing an image of the front of the vehicle, a rear image capturing apparatus of capturing an image of the rear of the vehicle, side image capturing apparatuses of capturing images of left and right sides of the vehicle, an image capturing apparatus of capturing an image of a face of a vehicle driver, and an interior image capturing apparatus of capturing an image of the interior of the vehicle.

In the present specification, an infrared (Infra-Red) camera for a vehicle, a black-box for a vehicle, a car dash cam, or a car video recorder are other expressions of the driving video recording system 1000 and may have the same meaning.

Referring to FIG. 1, the camera 100 includes a capturing unit 110, an event detection sensor 120, and a camera connector 130.

The capturing unit 110 may capture surrounding images of a moving body. Here, the image is a video captured in at least one situation during parking, stopping, and driving of the vehicle, and may include at least one image of the front, rear, side, and interior of the vehicle. In this case, the capturing unit 110 may include an infrared camera capable of monitoring a driver's face or pupil, and the control unit 220 may determine a driver's state including whether or not the driver is drowsy by monitoring the driver's face or pupil through the infrared camera.

The capturing unit 110 may include a lens unit, an image sensor, an image signal processor (ISP), a serializer, etc.

The event detection sensor 120 is a sensor that detects an event, and may include an impact event detection sensor that detects an impact applied to a vehicle and/or a motion event detection sensor that detects an object such as a person, vehicle, or animal approaching the vehicle. However, the present disclosure is not limited thereto, and the event detection sensor 120 may be a concept that includes sensors that detect various events that trigger the operation of the driving video recording system 1000.

The camera connector 130 may perform interface functions between the camera 100 and the main body 200, such as receiving power from the main body 200 and performing data communication.

Meanwhile, the main body 200 includes an image processing unit 210, a control unit 220, a main body connector 230, and a power supply unit 240.

The image processing unit 210 may receive and process an image captured by the capturing unit 110 and store the received and processed image in a memory (not illustrated). For example, the image processing unit 210 may analyze an image received from the camera 100 and perform an analysis to determine whether an advanced driving assistance system (ADAS) is required for the driver of the vehicle. Here, the ADAS may include detecting a start of a vehicle located in front of the vehicle and informing a driver whether a forward vehicle start alarm (FVSA) is required, detecting whether a signal changes and informing a driver whether a traffic light change alarm (TLCA) is required, detecting whether the vehicle departs from a lane and informing the driver whether a lane departure warning (LDWS) is required, detecting the risk of a collision with a vehicle in front of the vehicle and informing the driver whether a forward collision warning (FCWS) is required, etc.

The control unit 220 may control the overall operation of the driving video recording system 1000. Specifically, the control unit 220 may set the recording mode of the driving video recording system 1000 based on whether the vehicle is started, the result of measuring the voltage of the vehicle battery, whether the vehicle advanced driving assistance system is required, the result of event detection of the event detection sensor 120, etc.

Here, the recording mode of the driving video recording system 1000 may include a driving recording mode and a parking recording mode. In this case, the driving recording mode may be a recording mode in which an engine of a vehicle is turned on, and the parking recording mode may be a recording mode in which engine of the vehicle is turned off.

The driving recording mode may include a continuous recording mode, an event recording mode, and a manual recording mode.

The continuous recording mode is a mode executed when the user turns on the engine of the vehicle and starts to drive the vehicle, and may be maintained while the vehicle continues to be driven. In the continuous recording mode, the driving video recording system 1000 may perform recording at a predetermined time interval (for example, 1 to 5 minutes). In the present disclosure, the continuous recording mode and a regular mode may be used as the same meaning.

The event recording mode may mean a mode that operates when an impact event is detected by the event detection sensor 120 or an ADAS event is detected while the vehicle is being driven. In the event recording mode, the driving video recording system 1000 may perform recording (e.g., recording from 10 seconds before the occurrence of the event to 10 seconds after the occurrence of the event) from a predetermined time before the occurrence of the event to a predetermined time after the occurrence of the event.

The manual recording mode may mean an operating mode in which a user manually inputs recording while the vehicle is being driven. In the manual recording mode, the driving video recording system 1000 may perform recording (e.g., recording from 10 seconds before the occurrence of the event to 10 seconds after the occurrence of the event) from a predetermined time before the occurrence of a manual recording request of the user to a predetermined time after the occurrence of the manual recording request of the user.

The parking recording mode may refer to a mode operated in a parked state of the vehicle in which the engine of the vehicle is turned off or the power supply from a battery for driving the vehicle is stopped. In the parking recording mode, the driving video recording system 1000 may perform recording when the event is detected during parking by the event detection sensor 120. For example, the control unit 220 may control the camera 100 to perform recording (for example, recording 10 seconds before or 10 seconds after an event occurs) of a certain section from a predetermined time before to a predetermined time after the impact event and/or the object detection event approaching the vehicle occurs.

In addition, the control unit 220 may control the power supply from the power supply unit 240 according to the recording mode of the video recording system 1000.

In particular, the control unit 220 may control the power supply from the power supply unit 240 so that the current consumption in the driving video recording system 1000 is minimized in the parking recording mode. For example, the control unit 220 may control the power supply unit 240 to turn off the power supply to the capturing unit 110 in the parking recording mode and turn on the power supply to the event detection sensor 120.

The main body connector 230 may perform an interface function between the main body 200 and the camera 100, such as supplying power to the camera 100 and performing data communication.

The power supply unit 240 may receive power from the battery of the vehicle in which the driving video recording system 1000 is installed, and may supply power to the driving video recording system 1000 for the operation of the system 100 under the control of the control unit 220.

In this case, the battery supplying power to the power supply unit 240 may include at least one of the main battery for the vehicle in which the driving video recording system 1000 is installed and an auxiliary battery for the vehicle.

The main battery for the vehicle is a device that supplies power required for all electronic devices and starting in the vehicle, and may generally start the vehicle, maintain the electric system in the vehicle, and provide power required during driving.

The auxiliary battery for the vehicle may be a device that supplies power separately from the main battery for the vehicle so that the driving video recording system 1000 may continuously operate when the vehicle is turned off.

Meanwhile, the camera connector 130 and the main body connector 230 may be connected to each other through a cable connecting them.

According to the present disclosure, the signal (power signal and data signal) line of the capturing unit 110 that captures the video and the signal (power signal and data signal) line of the event detection sensor 120 that detects the event in the parking recording mode may be configured separately from each other, and the control unit 220 may control each line separately to minimize the current consumption of the driving video recording system in the parking recording mode, thereby expecting the effects of the increased recording time and increased battery life in the parking recording mode.

In this case, configuring the signal lines separately may include configuring each signal line physically separately from each other. However, the present disclosure is not limited thereto, and separately configuring the signal lines may be a concept that includes configuring the signal lines separately using the same physical configuration but through signal transmission control via software.

The signal line according to the present disclosure will be described later with reference to FIG. 3.

Figure 2:
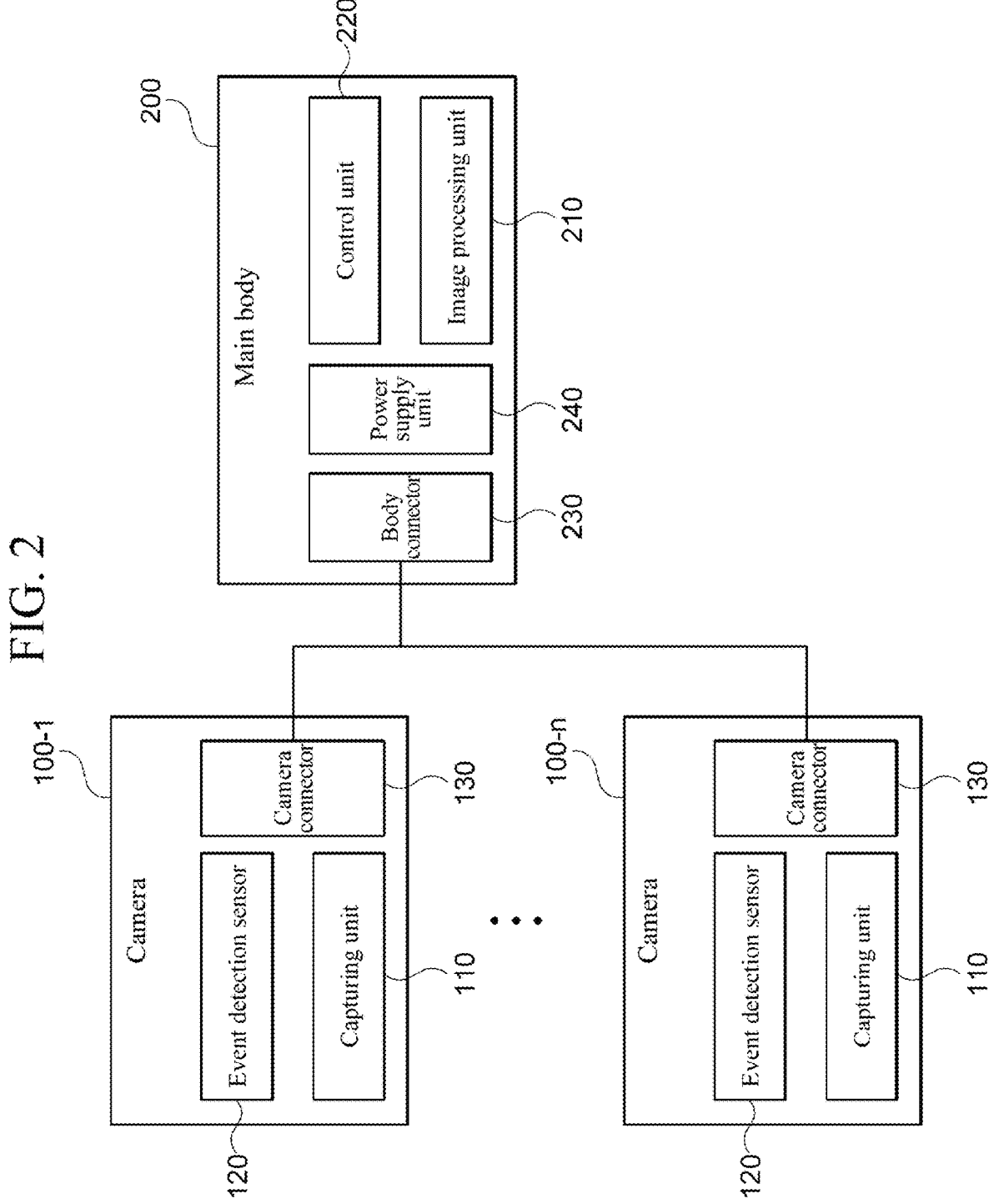
FIG. 2 is a block diagram illustrating in detail a driving video recording system according to another embodiment of the present disclosure.

FIG. 2 is a block diagram illustrating in detail a driving video recording system according to another embodiment of the present disclosure. Referring to FIG. 2, it may be implemented that the main body 200 may be connected to a plurality of cameras 100-1, 100-2, . . . , 100-*n*. In this case, each of the plurality of cameras 100-1, 100-2, . . . , 100-*n* may include all or part of a front camera, a rear camera for capturing the rear, a side camera for capturing the left and right, a camera for capturing the face of a vehicle driver, and a camera for capturing the interior of a vehicle. The images captured by each capturing unit 110 may be transmitted to the main body 200. The events detected by each event detection sensor 120 may be transmitted to the main body 200. Here, the plurality of cameras 100-1, 100-2, . . . , 100-*n* and the main body 200 may communicate in a serial transmission manner.

Figure 3:
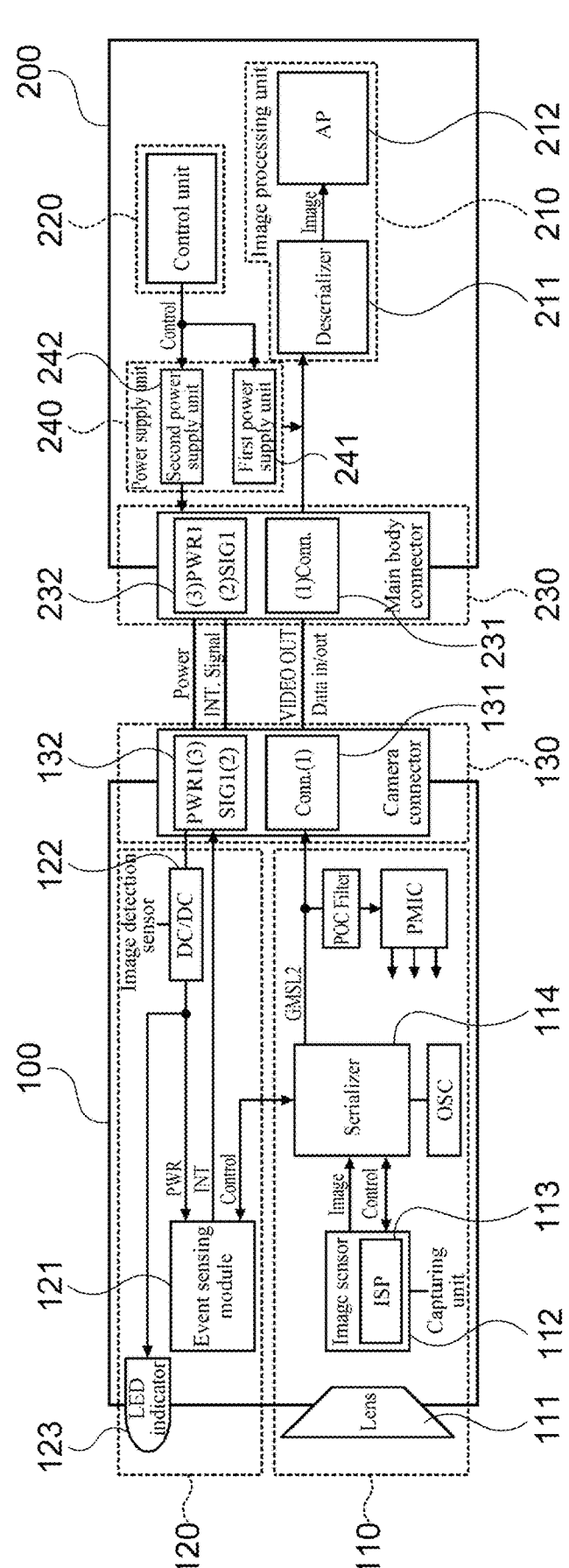
FIG. 3 is a block diagram illustrating in detail the driving video recording system according to an embodiment of the present disclosure.

FIG. 3 is a block diagram illustrating in detail the driving video recording system according to an embodiment of the present disclosure. Referring to FIG. 3, the capturing unit 110 may include a lens unit 111, an image sensor 112, an ISP 113, a serializer 114, etc. The lens unit 111 may perform a function of focusing an optical signal, and the optical signal transmitted through the lens unit 111 reaches a capturing area of the image sensor 112 to form an optical image. Here, as the image sensor 112, a charge coupled apparatus (CCD), a complementary metal oxide semiconductor image sensor (CIS), a high-speed image sensor, or the like, that converts an optical signal into an electrical signal may be used.

The image sensor 112 may include the ISP 113 that processes raw data collected from the image sensor. The ISP 113 may perform functions such as noise removal, white balance adjustment, gamma correction, color filter correction, and tone mapping.

The serializer 114 performs a function of converting multiple parallel data into one serial data. The serializer 114 may transmit the converted data to the deserializer 211 of the image processing unit 210 of the main body 200 through the first camera connector 131 of the camera connector 130, the first main body connector 231 of the main body connector 230, and a cable connecting them.

Meanwhile, although no separate drawing symbol was entered, the capturing unit 110 may further include a power over coax (POC) filter, and may perform a function of separating the power supply and data signal so that the power supply and data signal are not mixed in the capturing unit 110 when the power and data signals are transmitted simultaneously through a single coaxial cable. In other words, when the power is supplied to the capturing unit 110 through the coaxial cable and a high-resolution video signal is transmitted at the same time, the power signal and the data signal may interfere with each other, and the POC filter may inhibit the interference.

In addition, the capturing unit 110 may include a power management IC (PMIC), and the PMIC may be a power management integrated circuit that efficiently supplies and manages power to the capturing unit 110.

The event detection sensor 120 may include all or part of the event sensing module 121, the indicator 123, and the DC-DC converter 122.

The event sensing module 121 may include an impact event sensing module and a motion event detection module. The impact event sensing module may be implemented as a G-Sensor for detecting impact or acceleration, and the motion event detection module may be implemented as a radar sensor.

The DC-DC converter 122 is a device that converts a direct current (DC) voltage into another direct current (DC) voltage, and may supply power required for the event sensing module 121 by converting an input DC voltage into a lower or higher DC voltage.

The indicator 123 may refer to an LED indicator or a notification device that visually informs the user of the state or operation of the driving video recording system 1000. For example, the indicator 123 may provide information such as whether the driving video recording system 1000 is operating normally, whether the recording is being performed properly, or whether errors have occurred, so the user may easily identify the state of the driving video recording system 1000. The indicator 123 may provide the notification information to the user through various colors and blinking patterns.

The image processing unit 210 may include a deserializer 211 and an application processor 212.

The deserializer 211 may perform a function of converting serialized data back into original parallel data and restoring the data to its original form.

The application processor (AP) 212 is a processor that processes and analyzes images. The application processor (AP) 212 may additionally process basic image data processed by the ISP 113 through more complex operations. For example, the application processor 212 may perform AI-based image recognition, object tracking, etc.

For example, the application processor 212 may analyze the captured image of the capturing unit 110 to determine whether the ADAS described above is required.

Meanwhile, according to the present disclosure, the signal (power signal and data signal) line of the capturing unit 110 that captures the video and the signal (power signal and data signal) line of the event detection sensor 120 that detects the event in the parking recording mode may be configured separately, and the control unit 220 may control each line separately.

To this end, the power supply unit 240 includes a first power supply unit 241 and a second power supply unit 242, and the first power supply unit 241 and the second power supply unit 242 may be supplied with power from the battery of the vehicle in which the driving video recording system 1000 is installed.

The first power supply unit 241 may supply power for the operations of the capturing unit 110 and the image processing unit 210. The second power supply unit 242 may supply power for the operation of the event detection sensor 210.

The power supply ON/OFF of the first power supply unit 241 and the second power supply unit 242 may be controlled by the control unit 230.

Meanwhile, the camera connector 130 may be formed on the camera 100 side, interfaces data communication between the capturing unit 110 and the image processing unit 210, and may include a first camera connector 131 that interfaces the power supply between the capturing unit 110 and the first power supply unit 241.

In addition, the camera connector 130 may include a second camera connector 132 that is formed on the camera 100 side, interfaces the power supply between the event detection sensor 120 and the second power supply unit 242, and interfaces data communication between the event detection sensor 120 and the control unit.

In addition, the main body connector 230 may include a first main body connector 231 that is formed on the main body 200 side, interfaces data communication between the capturing unit 110 and the image processing unit 210, and interfaces the power supply between the capturing unit 110 and the first power supply unit 241.

In addition, the main body connector 230 may include a second main body connector 232 that is formed on the main body 100 side, interfaces the power supply between the event detection sensor 120 and the second power supply unit 242, and interfaces data communication between the event detection sensor 120 and the control unit.

The "Conn." of the first camera connector 131 and the first main body connector 231 may use a 1-pin FAKRA in the power over coax (POC) method, and a 2-pin Connector in a power over data line (PODL) method. In this way, data signals and power signals may be transmitted and received between the first camera connector 131 and the first main body connector 231.

In addition, a "PWR1" and "SIG1" of the second camera connector 132 and the second main body connector 232 may use 2-pin Connectors. In this way, the data signal and the power signal may be transmitted and received between second camera connector 132 and the second main body connector 232.

Meanwhile, the camera connector 130 and the main body connector 230 may be connected to each other through a cable connecting them.

Meanwhile, the control unit 220 may control the overall operation of the driving video recording system 1000. Specifically, the control unit 220 may set the recording mode of the driving video recording system 1000 based on whether the vehicle is started, the result of measuring the voltage of the vehicle battery, whether the vehicle advanced driving assistance system is required, the result of event detection of the event detection sensor 120, etc. Here, the recording mode of the driving video recording system 1000 may include a driving recording mode and a parking recording mode.

In addition, the control unit 220 may control the power supply from the power supply unit 240 according to the recording mode of the driving video recording system 1000. Specifically, the control unit 220 may control the power supply from the power supply unit 240 so that the current consumption in the driving video recording system 1000 is minimized in the parking recording mode. That is, the control unit 220 may minimize the battery consumption in the vehicle by causing the driving video recording system 1000 to operate in a low-power mode in the parking recording mode. The operation of the control unit 220 will be described later with reference to FIGS. 6 and 7.

Figures 4A, 4B:
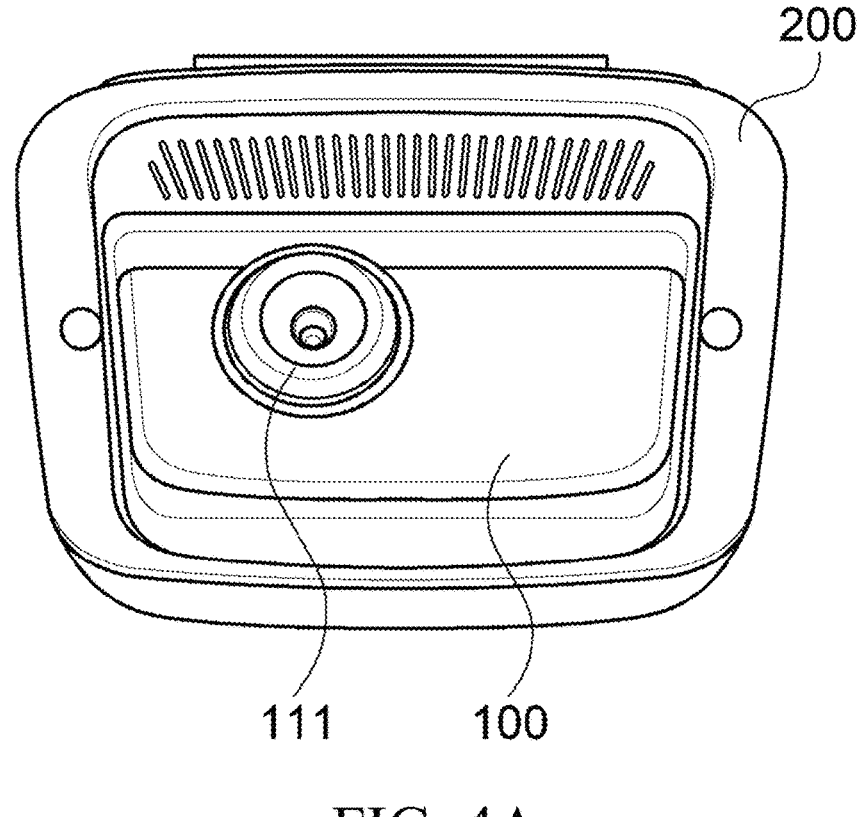
FIGS. 4A, 4B, and 5 are diagrams illustrating an implementation example of the driving video recording system according to an embodiment of the present disclosure.
Figure 5:
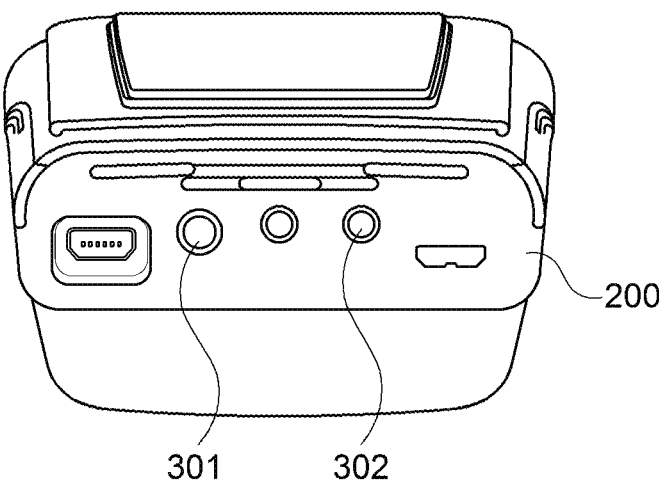

FIGS. 4A, 4B, and 5 are diagrams illustrating an implementation example of the driving video recording system according to an embodiment of the present disclosure. Referring to FIG. 4, the camera 100 and the main body 200 may be configured to be physically separate from each other. In addition, the camera 100 and the main body 200 may be implemented to be detachable from each other.

The main body 200 may include not only a frame function for installing the driving video recording system 1000 in a vehicle, but also the image processing unit 210, the control unit 220, the main body connector 230, and the power supply unit 240 described above.

In addition, the camera 100 may be detachably installed in the main body 200, and the camera 100 may include the capturing unit 110, the event detection sensor 120, and the camera connector 130.

Referring to FIG. 5, one area of the main body 200 may include a first input unit 301 that receives power from a main battery for a vehicle, and a second input unit 302 that supplies power from an auxiliary battery for a vehicle. The power input through the first input unit 301 and the second input unit 302 may be supplied to the power supply unit 240 inside the main body 200.

Figure 6:
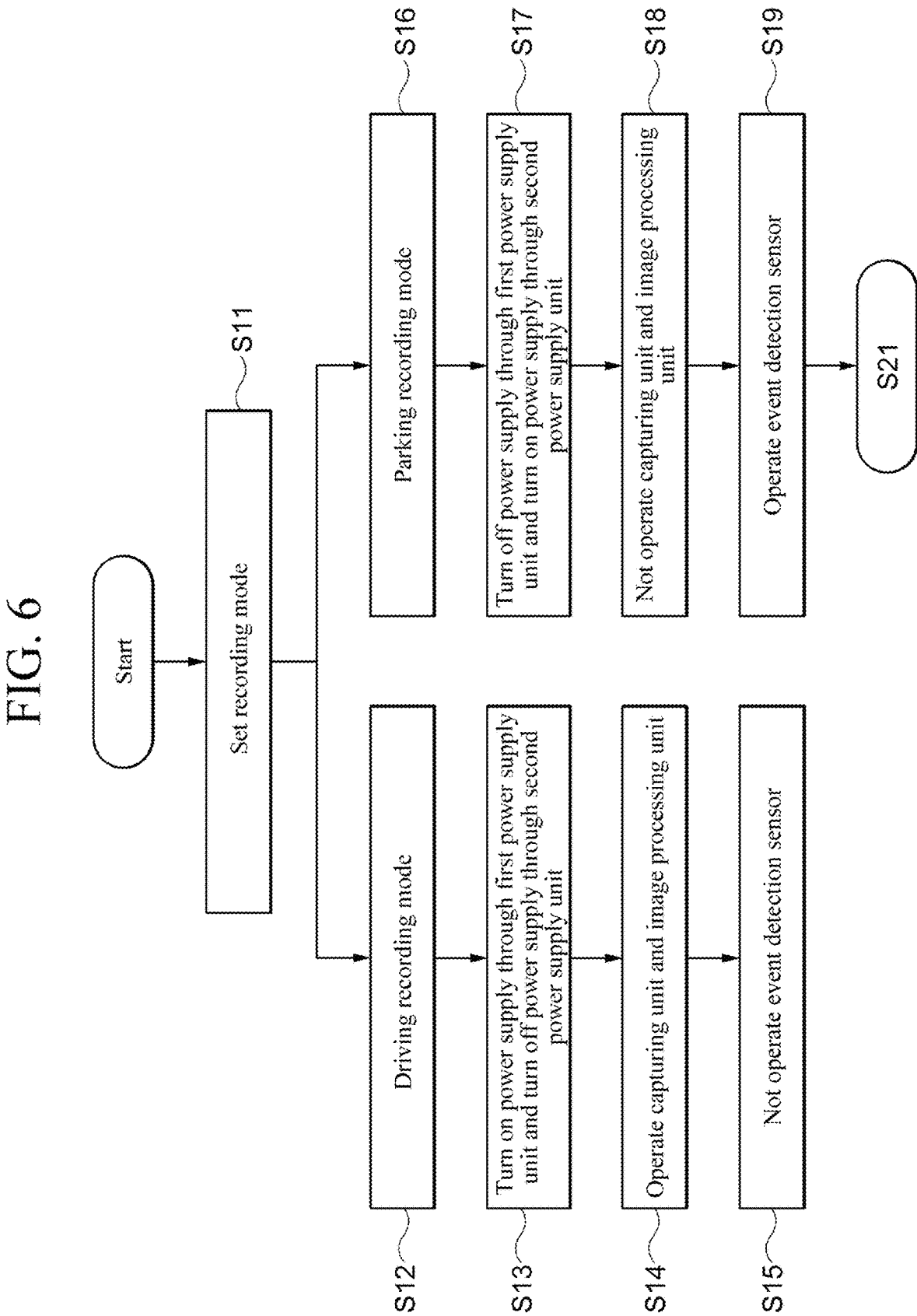
FIGS. 6 and 7 are flowcharts illustrating a method for reducing current consumption under control of a control unit according to an embodiment of the present disclosure.
Figure 7:
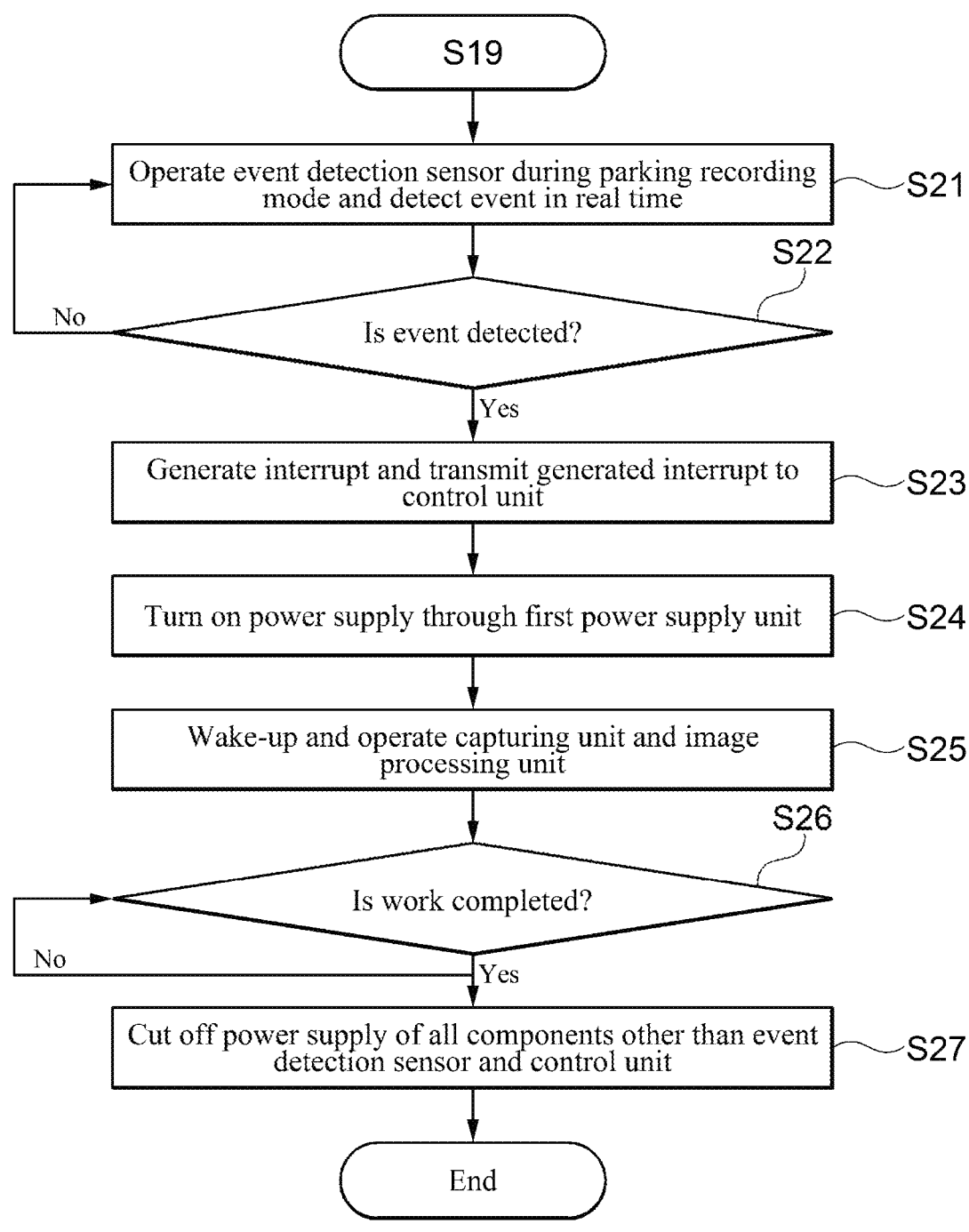

FIGS. 6 and 7 are flowcharts illustrating a method for reducing current consumption under control of the control unit 220 according to an embodiment of the present disclosure.

FIG. 6 is a flowchart illustrating a power supply control process in a driving recording mode and a parking recording mode according to an embodiment of the present disclosure. Referring to FIG. 6, the control unit 220 may set the recording mode of the driving video recording system 1000 (S11). For example, the control unit 220 may set the driving recording mode while the vehicle start is on, and may set the parking recording mode while the vehicle start is off.

When the driving recording mode is set (S12), the control unit 220 may control the power supply unit 240 to turn on the power supply through the first power supply unit 241 and turn off the power supply through the second power supply unit 242 (S13).

In this case, the capturing unit 110 and the image processing unit 210 may be supplied with power from the first power supply unit 241 through the first camera connector 131 and the first main body connector 231, and the capturing unit 110 and the image processing unit 210 may operate (S14). Depending on the operations of the capturing unit 110 and the image processing unit 210, the image captured by the capturing unit 110 may be transmitted to the image processing unit 210, and the image processing unit 210 may perform the image processing. However, since the power supply of the second power supply unit 242 is cut off through the second camera connector 132 and the second main body connector 232 in the event detection sensor 120, the event detection sensor 120 may not operate (S15).

Meanwhile, when the driving recording mode is set (S16), the control unit 220 may control the power supply unit 240 to turn off the power supply through the first power supply unit 241 and turn on the power supply through the second power supply unit 242 (S17).

In this case, since the power supply of the first power supply unit 241 to the capturing unit 110 and the image processing unit 210 through the first camera connector 131 and the first main body connector 231 is cut off, the capturing unit 110 and the image processing unit 210 no longer operate (become in a shut-down state) (S18), and the current consumption of the capturing unit 110 and the image processing unit 210 disappears.

On the other hand, the event detection sensor 120 may operate because the power supply of the second power supply unit 242 starts through the second camera connector 132 and the second main body connector 232 (S19).

Meanwhile, a method for reducing current consumption of the driving video recording system 1000 when the impact or motion is detected from the outside of the vehicle while the event detection sensor 120 is operating in step S19 will be described with reference to FIG. 5.

FIG. 7 is a flowchart illustrating a method for reducing current consumption of the driving video recording system 1000 when the event occurs outside the vehicle according to an embodiment of the present disclosure. Referring to FIG. 7, the event detection sensor 120 operates in the parking recording mode and may detect an event in real time (S21).

When at least one of the impact event and/or the motion event is detected (S21: Y), the event detection sensor 120 may generate an interrupt and transmit the generated interrupt to the control unit 220 (S22). The interrupter signal may be transmitted to the control unit 220 through the second camera connector 132 and the second main body connector 232.

The control unit 220 that receives the interrupt may control the power supply unit 240 to turn on the power supply through the first power supply unit 241 (S24). In this case, the capturing unit 110 and the image processing unit 210 may be supplied with power from the first power supply unit 241 through the first camera connector 131 and the first main body connector 231, and the capturing unit 110 and the image processing unit 210 may wake-up and operate (S25). Depending on the operations of the capturing unit 110 and the image processing unit 210, the image captured by the capturing unit 110 may be transmitted to the image processing unit 210, and the image processing unit 210 may perform the image processing.

Meanwhile, when the work of the capturing unit 110 and the image processing unit 210 is completed (S26: Y), the control unit 220 may control the power supply unit 240 to turn off the power supply through the first power supply unit 241 (S27). Here, the completion of the work may include, for example, the state in which the event detection ends in the event detection sensor 120.

In this case, the power supply to all components except the event detection sensor 120 and the control unit 220 is shut down, thereby minimizing the current consumption again.

According to the present disclosure, the signal (power signal and data signal) line of the capturing unit that captures the video and the signal (power signal and data signal) line of the event detection sensor that detects the event in the parking recording mode may be configured separately from each other, and the control unit may control each line separately to minimize the current consumption of the driving video recording system in the parking recording mode, thereby expecting the effects of the increased recording time and increased battery life in the parking recording mode.

Hereinafter, an autonomous driving control system, an autonomous driving moving body, and user device using various information, data, images, etc. collected through the driving video recording system 1000 according to the present disclosure will be described in more detail with reference to FIGS. 8 to 11.

Figure 8:
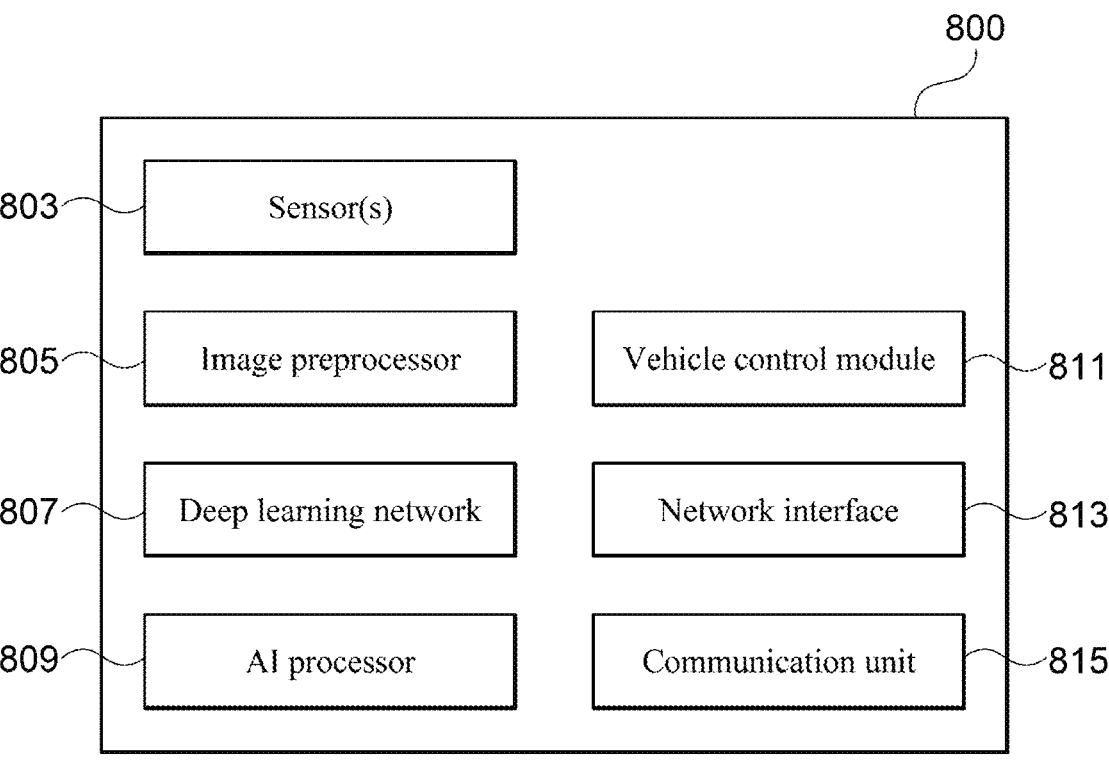
FIG. 8 illustrates an example of a block diagram illustrating an autonomous driving control system of a vehicle according to an embodiment.

FIG. 8 illustrates an example of a block diagram illustrating an autonomous driving control system of a vehicle according to an embodiment.

Referring to FIG. 8, an autonomous driving control system 800 of the vehicle may include a deep learning network including sensors 803, an image preprocessor 805, a deep learning network 807, an artificial intelligence (AI) processor 809, a vehicle control module 811, a network interface 813, and a communication unit 815. In various embodiments, the respective components may be connected to each other through various interfaces. For example, sensor data sensed and output by the sensors 803 may be fed to the image preprocessor 805. The sensor data processed by the image preprocessor 805 may be fed to the deep learning network 807 running on the AI processor 809. The output of the deep learning network 807 running on the AI processor 809 may be fed to the vehicle control module 811. The intermediate results of the deep learning network 807 running on the AI processor 809 may be fed to the AI processor 809. In various embodiments, the network interface 813 communicates with electronic devices in the vehicle to transmit autonomous driving path information and/or autonomous driving control commands for autonomous driving of the vehicle to internal block configurations. In an embodiment, the network interface 813 may be utilized to transmit the sensor data acquired via the sensor(s) 803 to an external server. In some embodiments, the autonomous driving control system 800 may include additional or fewer components as appropriate. For example, in some embodiments, the image preprocessor 805 is an optional component. As another example, a post-processing component (not illustrated) may be included within the autonomous driving control system 800 to perform the post-processing on the output of the deep learning network 807 before the output is provided to the vehicle control module 811.

In some embodiments, the sensors 803 may include one or more sensors. In various embodiments, the sensors 803 may be attached to different locations on the vehicle. The sensors 803 may face one or more different directions. For example, the sensors 803 may be attached to a front, sides, a rear, and/or a roof of the vehicle in directions such as forward-facing, rear-facing, side-facing, and the like. In some embodiments, the sensors 803 may be image sensors such as high dynamic range cameras. In some embodiments, the sensors 803 include non-visual sensors. In some embodiments, the sensors 803 include a radio detection and ranging (RADAR), a light detection and ranging (LiDAR), and/or an ultrasonic sensor in addition to the image sensors. In some embodiments, the sensors 803 are not mounted on a vehicle having the vehicle control module 811. For example, the sensors 803 may be included as a part of a deep learning system for capturing sensor data, and may be attached to an environment or a road and/or mounted on surrounding vehicles.

In some embodiments, the image pre-processor 805 is used to preprocess the sensor data of the sensors 803. For example, the image preprocessor 805 may be used to preprocess the sensor data, split the sensor data into one or more components, and/or post-process one or more components. In some embodiments, the image preprocessor 805 may be a graphics processing unit (GPU), a central processing unit (CPU), an image signal processor, or a specialized image processor. In various embodiments, the image preprocessor 805 may be a tone-mapper processor for processing high dynamic range data. In some embodiments, the image preprocessor 805 may be a component of the AI processor 809.

In some embodiments, the deep learning network 807 is a deep learning network for implementing control commands for controlling an autonomous vehicle. For example, the deep learning network 807 may be an artificial neural network, such as a convolutional neural network (CNN), trained using the sensor data, and the output of the deep learning network 807 is provided to the vehicle control module 811.

In some embodiments, the artificial intelligence (AI) processor 809 is a hardware processor for running the deep learning network 807. In some embodiments, the AI processor 809 is a specialized AI processor for performing inference using convolutional neural networks (CNNs) on the sensor data. In some embodiments, the AI processor 809 is optimized for a bit depth of the sensor data. In some embodiments, the AI processor 809 may be optimized for deep learning operations, such as operations of a neural network including convolution, inner product, vector, and/or matrix operations. In some embodiments, the AI processor 809 may be implemented using a plurality of graphic processing units (GPUs) that may effectively perform parallel processing.

In various embodiments, the AI processor 809 may be coupled via an input/output interface to a memory configured to provide the AI processor with instructions to perform the deep learning analysis on the sensor data received from the sensor(s) 803 while the AI processor 809 is running and to determine the machine learning results used to operate the vehicle at least partially autonomously. In some embodiments, the vehicle control module 811 may be used to process commands for vehicle control output from the artificial intelligence (AI) processor 809 and to translate an output of the AI processor 809 into instructions for controlling modules of each vehicle in order to control various modules of the vehicle. In some embodiments, the vehicle control module 811 is used to control a vehicle for autonomous driving. In some embodiments, the vehicle control module 811 may adjust steering and/or speed of the vehicle. For example, the vehicle control module 811 may be used to control driving of the vehicle, such as deceleration, acceleration, steering, lane change, and lane maintenance. In some embodiments, the vehicle control module 811 may generate control signals for controlling vehicle lighting, such as brake lights, turns signals, and headlights. In some embodiments, the vehicle control module 811 may be used to control vehicle audio related systems such as a vehicle's sound system, vehicle's audio warnings, a vehicle's microphone system, and a vehicle's horn system.

In some embodiments, the vehicle control module 811 may be used to control notification systems including warning systems for notifying passengers and/or driver of driving events, such as an approach to an intended destination or a potential collision. In some embodiments, the vehicle control module 811 may be used to adjust sensors, such as sensors 803 of the vehicle. For example, the vehicle control module 811 may modify the orientation of the sensors 803, change output resolution and/or a format type of the sensors 803, increase or decrease a capture rate, adjust a dynamic range, and adjust a focus of a camera. In addition, the vehicle control module 811 may individually or collectively turn on/off operations of the sensors.

In some embodiments, the vehicle control module 811 may be used to change parameters of the image preprocessor 805 in a manner such as a manner of modifying frequency ranges of filters, adjusting features and/or edge detection parameters for object detection, or adjusting channels and bit depth. In various embodiments, the vehicle control module 811 may be used to control autonomous driving of the vehicle and/or a driver assistance function of the vehicle.

In some embodiments, the network interface 813 may be in charge of an internal interface between block components of the autonomous driving control system 800 and the communication unit 815. Specifically, the network interface 813 may be an intercommunication interface for receiving and/or sending data including voice data. In various embodiments, the network interface 813 may be connected to external servers in order to connect voice calls, receive and/or sends text messages, transmit the sensor data, updates software of the vehicle with the autonomous driving control system, or to update software of the autonomous driving control system of the vehicle through the communication unit 815.

In various embodiments, the communication unit 815 may include various wireless interfaces in a cellular or WiFi manner. For example, the network interface 813 may be used to receive an update for operating parameters and/or instructions for the sensors 803, the image preprocessor 805, the deep learning network 807, the AI processor 809, and the vehicle control module 811 from external servers connected through the communication unit 815. For example, a machine learning model of the deep learning network 807 may be updated using the communication unit 815. According to another example, the communication unit 815 may be used to update operating parameters of the image prepro- cessor 805 such as image processing parameters and/or firmware of the sensors 803.

In another embodiment, the communication unit 815 may be used to activate communication for emergency services and emergency contact in an accident or a near-accident event. For example, in a crash event, the communication unit 815 may be used to call emergency services for assistance, and may notify the outside of emergency services of crash details and a location of the vehicle. In various embodi- ments, the communication unit 815 may update or obtain an expected arrival time and/or a destination location.

According to an embodiment, the autonomous driving control system 800 illustrated in FIG. 8 may be configured as an electronic device of the vehicle. According to an embodiment, the AI processor 809 of the autonomous driv- ing control system 800 may be controlled to train the autonomous driving software of the vehicle by controlling to input autonomous driving disengagement event-related information as training set data of the deep learning network when an autonomous driving disengagement event occurs from a user during the autonomous driving of the vehicle.

Figure 9:
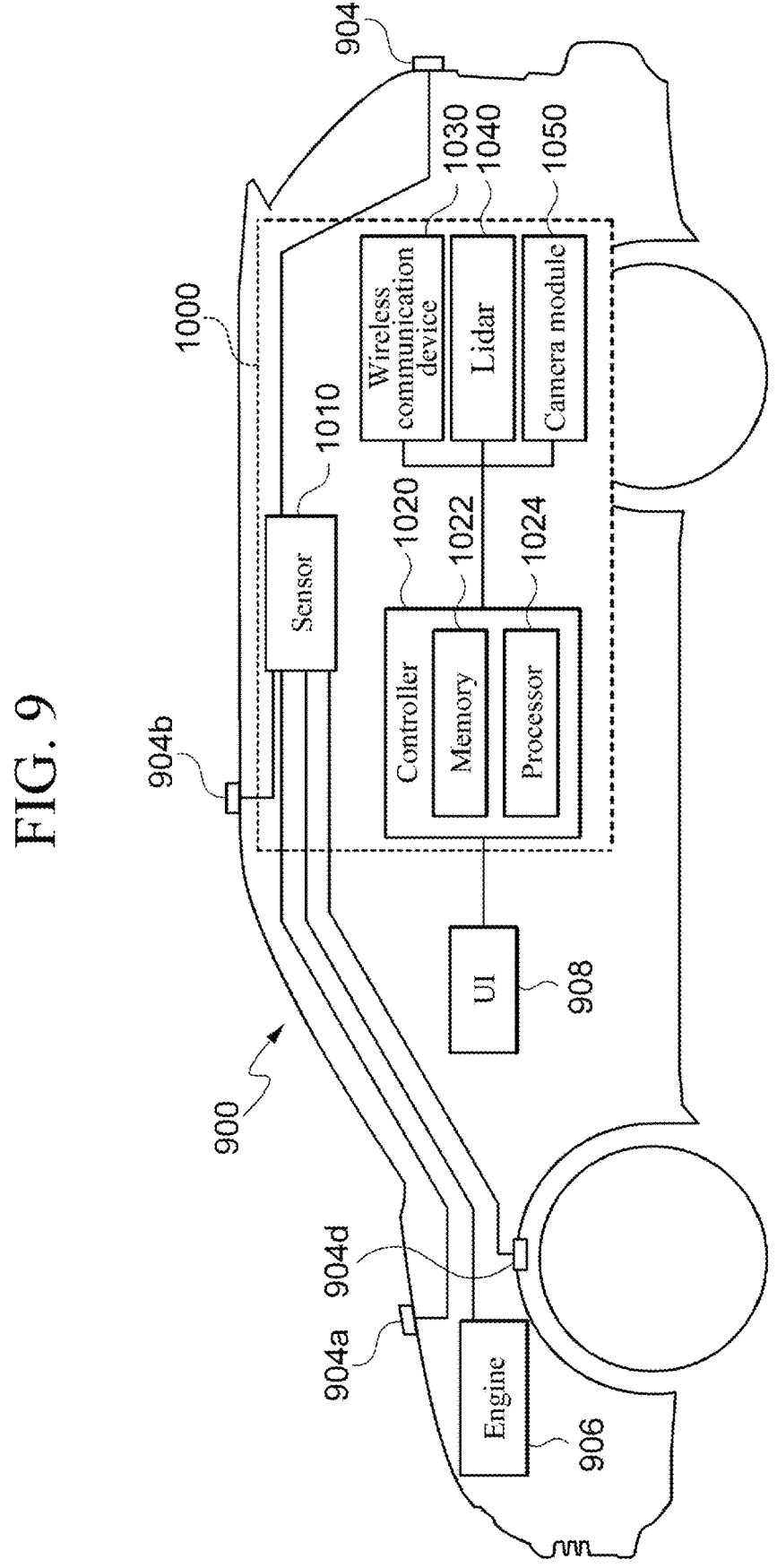
FIGS. 9 and 10 are examples of a block diagram illustrating an autonomous driving moving body according to an embodiment.
Figure 10:
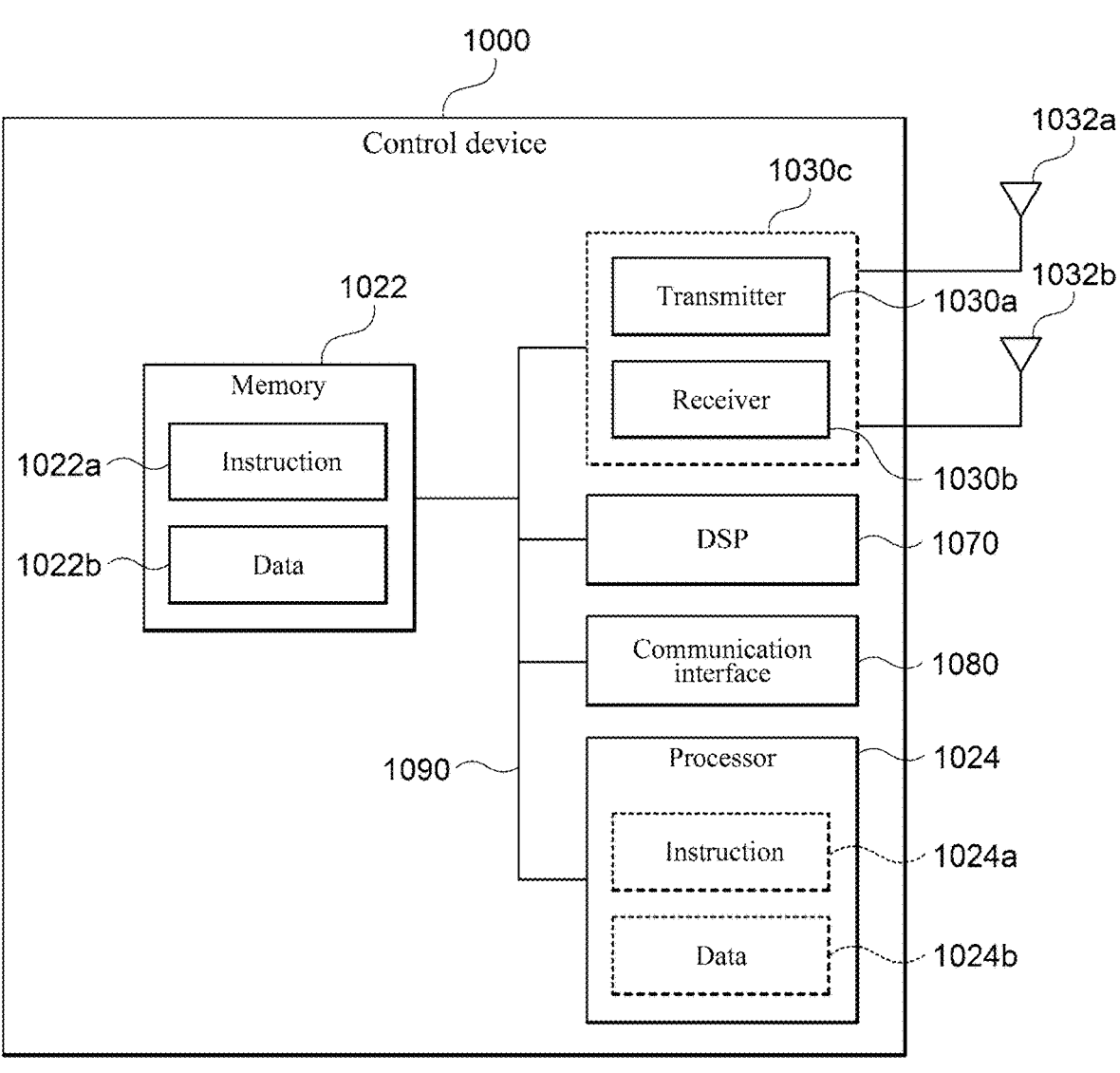
Figure 11:
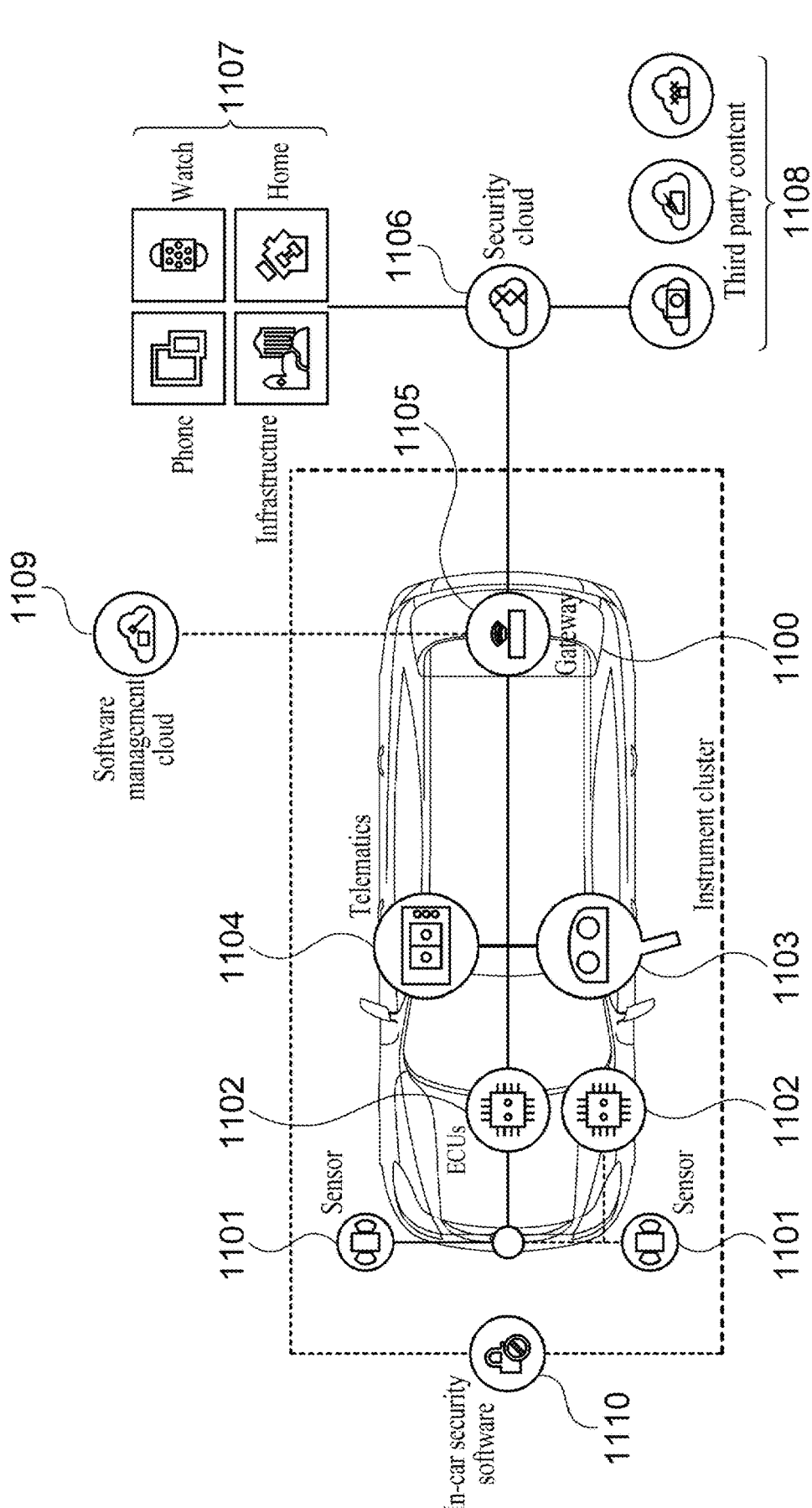
FIG. 11 is an example of a gateway related to a user device according to an embodiment.

FIGS. 8 and 10 are examples of block diagrams illustrat- ing an autonomous driving moving body according to an embodiment. Referring to FIG. 9, an autonomous driving moving body 900 according to the present embodiment may include a control device 1000, sensing modules 904a, 904b, 904c, and 904d, an engine 906, and a user interface 908.

The autonomous driving moving body 900 may have an autonomous driving mode or a manual mode. For example, the manual mode may be switched to an autonomous driving mode or the autonomous driving mode may be switched to a manual mode according to a user input received through the user interface 908.

When the autonomous driving moving body 900 operates in the autonomous driving mode, the autonomous driving moving body 900 may operate under the control of the control device 1000.

In the present embodiment, the control device 1000 may include a controller 1020 including a memory 1022 and a processor 1024, a sensor 1010, a communication device 1030, and an object detection device 1040.

Here, the object detection device 1040 may perform all or part of the functions of the distance measuring device (e.g., the electronic device 101).

That is, in the present embodiment, the object detection device 1040 is a device for detecting an object located outside the autonomous driving moving body 900, and the object detection device 1040 may detect an object located outside the autonomous driving moving body 900 and generate object information according to the detection result.

The object information may include information on exis- tence or absence of an object, position information of the object, distance information between the moving body and the object, and relative speed information between the moving body and the object.

The object may include various objects located outside the autonomous driving moving body 900, such as lanes, other vehicles, pedestrians, traffic signals, lights, roads, structures, speed bumps, terrain, and animals. Here, the traffic signal may include a concept including traffic lights, traffic signs, and patterns or texts drawn on the road surface.

In addition, light may be light generated from a lamp equipped on another vehicle, light generated from a street- light, or sunlight.

In addition, the structure may be an object located around a road and fixed to the ground. For example, the structure may include streetlights, street trees, buildings, utility poles, traffic lights, and bridges. Terrain may include mountains, hills, and the like.

The object detection device 1040 may include a camera module. The controller 1020 may extract object information from the external image photographed by the camera mod- ule and process information on the object information.

In addition, the object detection device 1040 may further include imaging devices for recognizing the external envi- ronment. In addition to LIDAR, RADAR, GPS device, odometry, and other computer vision devices, ultrasonic sensors, and infrared sensors may be used, and these devices may be selectively or simultaneously operated as needed to enable more precise detection.

Meanwhile, the distance measuring device according to an embodiment of the present disclosure may calculate a distance between the autonomous driving moving body 900 and the object, and may control the operation of the moving body based on the calculated distance in conjunction with the control device 1000 of the autonomous driving moving body 900.

For example, when there is a possibility of collision depending on the distance between the autonomous driving moving body 900 and the object, the autonomous driving moving body 900 may control brakes to slow down or stop. As another example, when the object is a moving object, the autonomous driving moving body 900 may control the driving speed of the autonomous driving moving body 900 to maintain a predetermined distance or more from the object.

The distance measuring device according to an embodi- ment of the present disclosure may be configured as a module within the control device 1000 of the autonomous driving moving body 900. That is, the memory 1022 and the processor 1024 of the control device 1000 may be config- ured to implement the collision inhibition method according to the present disclosure in software.

In addition, the sensor 1010 may be connected to the moving body internal/external environment sensing mod- ules 904a, 904b, 904c, and 904d to obtain various sensing information. Here, the sensor 1010 may include a posture sensor (e.g., a yaw sensor, a roll sensor, a pitch sensor, a collision sensor, a wheel sensor, a speed sensor, an inclina- tion sensor, a weight detection sensor, a heading sensor, a gyro sensor, a position module, a moving body forward/ backward sensor, a battery sensor, a fuel sensor, a tire sensor, a steering sensor by steering wheel rotation, a moving body internal temperature sensor, a moving body internal humid- ity sensor, an ultrasonic sensor, an illuminance sensor, an accelerator pedal position sensor, a brake pedal position sensor, etc.)

Accordingly, the sensor 1010 may acquire sensing signals such as moving body posture information, moving body collision information, moving body direction information, moving body position information (GPS information), mov- ing body angle information, moving body speed informa- tion, moving body acceleration information, moving body inclination information, moving body forward/backward information, battery information, fuel information, tire information, moving body lamp information, moving body internal temperature information, moving body internal humidity information, steering wheel rotation angle, moving body external illuminance, acceleration, pressure applied to an accelerator pedal, pressure applied to a brake pedal, etc.

In addition, the sensor 1010 may further include an accelerator pedal sensor, a pressure sensor, an engine speed sensor, an air flow sensor (AFS), an intake temperature sensor (ATS), a water temperature sensor (WTS), a throttle position sensor (TPS), a TDC sensor, a crank angle sensor (CAS), etc.

In this way, the sensor 1010 may generate moving body state information based on the sensing data.

The wireless communication device 1030 is configured to implement wireless communication between the autonomous driving moving bodies 900. For example, the autonomous driving moving body 900 may communicate with a user's mobile phone, or another wireless communication device 1030, another moving body, a central device (traffic control device), a server, etc. The wireless communication device 1030 may transmit and receive a wireless signal according to an access wireless protocol. The wireless communication protocol may be Wi-Fi, Bluetooth, long-term evolution (LTE), code division multiple access (CDMA), wideband code division multiple access (WCDMA), global systems for mobile communications (GSM), and the communication protocols are not limited thereto.

In addition, in the present embodiment, the autonomous driving moving body 900 can also implement communication between the moving bodies through the wireless communication device 1030. That is, the wireless communication device 1030 may communicate with other moving bodies on the road through vehicle-to-vehicle (V2V) communication. The autonomous driving moving body 900 may transmit and receive information such as driving warnings and traffic information through vehicle-to-vehicle communication, and may also request information or receive requests from other moving bodies. For example, the wireless communication device 1030 may perform V2V communication as a dedicated short-range communication (DSRC) device or a cell-V2V (C-V2V) device. In addition to the inter-vehicle communication, vehicle to everything communication (V2X) between the vehicle and other objects (for example, an electronic device carried by a pedestrian) may be implemented through the wireless communication device 1030.

In this embodiment, the controller 1020 is a unit that controls the overall operation of each unit within the autonomous driving moving body 900, and may be configured by the manufacturer of the moving body during manufacturing or may be additionally configured after manufacturing to perform the function of autonomous driving. Alternatively, a configuration for performing continuous additional functions may be included through an upgrade of the controller 1020 configured at the time of manufacturing. Such a controller 1020 may also be called an electronic control unit (ECU).

The controller 1020 may collect various data from the connected sensors 1010, the object detection device 1040, the communication device 1030, etc., and transmit control signals to other components within the moving body, such as the sensor 1010, the engine 906, the user interface 908, the communication device 1030, and the object detection device 1040, based on the collected data. In addition, although not illustrated, the control signals may also be transmitted to the acceleration device, the braking system, the steering device, or the navigation device related to the driving of the moving body.

In this embodiment, the controller 1020 may control the engine 906, and for example, may detect the speed limit of the road on which the autonomous driving moving body 900 is driving and control the engine 906 so that the driving speed does not exceed the speed limit, or control the engine 906 so that the driving speed of the autonomous driving moving body 900 is accelerated within the range that does not exceed the speed limit.

In addition, when the autonomous driving moving body 900 is approaching or departing from a lane while the autonomous driving moving body 900 is driving, the controller 1020 may determine whether such approaching or departing from the lane is due to a normal driving situation or due to other driving situations, and control the engine 906 to control the driving of the moving body based on the determination result. Specifically, the autonomous driving moving body 900 may detect lanes formed on both sides of a road on which the moving body is driving. In this case, the controller 1020 determines whether the autonomous driving moving body 900 is approaching or departing from the lane, and when it is determined that the autonomous driving moving body 900 is approaching or departing from the lane, it may determine whether such driving is due to a precise driving situation or due to another driving situation. Here, as an example of the normal driving situation, it may be a situation where the road change of the moving body is required. As an example of another driving situation, it may be a situation where the road change of the moving body is not required. When the controller 1020 determines that the autonomous driving moving body 900 is approaching or departing from the lane in a situation where the road change of the moving body is not required, it may control the driving of the autonomous driving moving body 900 so that the autonomous driving moving body 900 does not depart from the lane and drives normally in the moving body.

When there is another moving body or an obstacle in front of the moving body, the engine 906 or the braking system may be controlled to decelerate the moving body, and in addition to the speed, the trajectory, the driving path, and the steering angle may be controlled. Alternatively, the controller 1020 may control the driving of the moving body by generating the necessary control signal according to the recognition information of other external environment such as the driving lane of the moving body, the driving signal.

In addition to generating its own control signal, the controller 1020 can control the driving of the moving body by performing communication with the surrounding moving body or the central server and transmitting a command for controlling the peripheral apparatuses through the received information.

In addition, the controller 1020 may generate a control signal to control calibration of the camera module 1050 to inhibit accurate moving body or lane recognition according to the present embodiment when the position or angle of view of the camera module 1050 changes. Therefore, in the present embodiment, the controller 1020 may generate a calibration control signal to the camera module 1050, so even if the mounting position of the camera module 1050 changes due to the vibration or impact generated according to the movement of the autonomous driving moving body 900, the normal mounting position, direction, angle of view, etc., of the camera module 1050 may be continuously maintained. The controller 1020 may generate the control signal to perform the calibration of the camera module 1050 when initial mounting position, direction, angle of view information, etc., of the camera module 1050 stored in advance and initial mounting position, direction, angle of view information, etc., of the camera module 1050 measured while the autonomous driving moving body 900 is driving vary by more than a threshold value.

In the present embodiment, the controller 1020 may include the memory 1022 and the processor 1024. The processor 1024 may execute software stored in the memory 1022 according to the control signal of the controller 1020. Specifically, the controller 1020 may store data and commands for performing a lane detection method according to the present disclosure in the memory 1022, and the commands may be executed by the processor 1024 to implement one or more of the methods disclosed herein.

In this case, the memory 1022 may be stored in a recording medium executable by the nonvolatile processor 1024. The memory 1022 may store software and data through appropriate internal and external devices. The memory 1022 may include a random access memory (RAM), a read only memory (ROM), a hard disk, and a memory 1022 device connected to a dongle.

The memory 1022 may store at least an operating system (OS), a user application, and executable commands. The memory 1022 may also store application data and array data structures.

The processor 1024 may be a controller, microcontroller, or state machine as a microprocessor or a suitable electronic processor.

The processor 1024 may be implemented in a combination of computing devices, and the computing device may be a digital signal processor, a microprocessor, or an appropriate combination thereof.

Meanwhile, the autonomous driving moving body 900 may further include the user interface 908 for user input to the control device 1000 described above. The user interface 908 may allow a user to input information with appropriate interactions. For example, the user interface may be implemented as a touch screen, a keypad, an operation button, or the like. The user interface 908 may transmit an input or a command to the controller 1020, and the controller 1020 may perform a control operation of the moving body in response to the input or command.

In addition, the user interface 908 may be configured to communicate with the autonomous driving moving body 900 via the wireless communication device 1030, which is an external device of the autonomous driving moving body 900. For example, the user interface 908 may be interoperable with a mobile phone, a tablet, or other computer devices.

Furthermore, in this embodiment, although the autonomous driving moving body 900 is described as including the engine 906, it may also include other types of propulsion systems. For example, the moving body may be driven by electrical energy and may be operated by hydrogen energy or a hybrid system combining them. Accordingly, the controller 1020 may include a propulsion mechanism according to the propulsion system of the vehicle the autonomous driving moving body 900, and may provide the control signal to components of each propulsion mechanism.

Hereinafter, the detailed configuration of the control device 1000 according to the present disclosure will be described in more detail with reference to FIG. 10.

The control device 1000 includes the processor 1024. The processor 1024 may be a general purpose single or multi-chip microprocessor, a dedicated microprocessor, a microcontroller, a programmable gate array, or the like. The processor may be referred to as a central processing unit (CPU). In addition, in the present embodiment, the processor 1024 may be used as a combination of a plurality of processors.

The control device 1000 also includes the memory 1022. The memory 1022 may be any electronic component capable of storing electronic information. The memory 1022 may also be a combination of memories 1022 in addition to a single memory.

Data and commands 1022a for performing the distance measuring method of the distance measuring device according to the present disclosure may be stored in the memory 1022. When the processor 1024 executes the instructions 1022a, all or part of the instructions 1022a and data 1022b required for executing the commands may be loaded (1024a and 1024b) onto the processor 1024.

The control device 1000 may include a transmitter 1030a, a receiver 1030b, or a transceiver 1030c to allow transmission and reception of signals. One or more antennas 1032a and 1032b may be electrically connected to a transmitter 1030a, a receiver 1030b, or each transceiver 1030c and may further include antennas.

The control device 1000 may include a digital signal processor (DSP) 1070. The DSP 1070 may enable the moving body to rapidly process digital signals.

The control device 1000 may include a communication interface 1080. The communication interface 1080 may include one or more ports and/or communication modules for connecting other devices to the control device 1000. The communication interface 1080 may enable the user and the control device 1000 to interact.

Various configurations of the control device 1000 may be connected together by one or more buses 1090, and the buses 1090 may include a power bus, a control signal bus, a status signal bus, a data bus, and the like. Under the control of the processor 1024, the components may transmit information to each other through the bus 1090 and perform a desired function.

Meanwhile, in various embodiments, the control device 1000 may be associated with a gateway for communicating with a secure cloud. For example, referring to FIG. 11, the control device 1000 may be associated with a gateway 1105 for providing information obtained from at least one of the components 1101 to 1104 of the vehicle 1100 to the security cloud 1106. For example, the gateway 1105 may be included within the control device 1000. In another example, the gateway 1105 may be configured as a separate device within the vehicle 1100, distinct from the control device 1000. The gateway 1105 is communicatively connected to the network within the vehicle 1100 secured by the software management cloud 1109, the security cloud 1106, and the in-car security software 1110, which have different networks.

For example, the component 1101 may be a sensor. For example, the sensor may be utilized to obtain information on at least one of the state of the vehicle 1100 or the state of the surroundings of the vehicle 1100. For example, the component 1101 may include sensor 1410.

For example, the component 1102 may be electronic control units (ECUs). For example, the ECUs may be used for engine control, transmission control, airbag control, and tire pressure management.

For example, the component 1103 may be an instrument cluster. For example, the instrument cluster may mean a panel located in front of the driver's seat among the dashboard. For example, the instrument cluster may be configured to show information necessary for driving to a driver (or passenger). For example, the instrument cluster may be used to display at least one of visual elements for indicating engine revolutions per minute (RPM) (or rotates per minute), visual elements for indicating speed of the vehicle 1100, visual elements for indicating remaining fuel level, visual elements for indicating gear state, or visual elements for indicating information obtained via component 1101.

For example, the component 1104 may be a telematics device. For example, the telematics device may mean a device that provides various mobile communication services, such as location information and safe driving, within the vehicle 1100 by combining a wireless communication technology and a global positioning system (GPS) technology. For example, the telematics device may be used to connect the vehicle 1100 to a driver, a cloud (e.g., a security cloud 1106), and/or the surrounding environment. For example, the telematics device may be configured to support high bandwidth and low latency for a technology of the 5G NR standard (e.g., V2X technology of 5G NR). For example, the telematics device may be configured to support the autonomous driving of the vehicle 1100.

For example, the gateway 1105 may be used to connect a network within the vehicle 1100 to an external network, such as the software management cloud 1109 and the security cloud 1106. For example, the software management cloud 1109 may be used to update or manage at least one software required for driving and managing the vehicle 1100. For example, the software management cloud 1109 may be linked to in-car security software 1110 installed in the vehicle. For example, the in-car security software 1110 may be used to provide a security function within the vehicle 1100. For example, the in-car security software 1110 may encrypt data transmitted and received through the in-car network using an encryption key obtained from an external authorized server for encryption of the in-car network. In various embodiments, the encryption key used by the in-car security software 1110 may be generated in response to the identification information (vehicle license plate, vehicle identification number (VIN)) of the vehicle or information uniquely assigned to each user (e.g., user identification information).

In various embodiments, the gateway 1105 may transmit data encrypted by the in-car security software 1110 based on the encryption key to the software management cloud 1109 and/or the security cloud 1106. The software management cloud 1109 and/or the security cloud 1106 can identify which vehicle or which user the data was received from by decrypting the data encrypted by the encryption key of the in-car security software 1110 using the decryption key that may decrypt the data. For example, since the decryption key is a unique key corresponding to the encryption key, the software management cloud 1109 and/or the security cloud 1106 may identify the transmitting entity (e.g., the vehicle or the user) of the data based on the data decrypted by the decryption key.

For example, the gateway 1105 may be configured to support the in-car security software 1110 and may be associated with the control device 1000. For example, the gateway 1105 may be associated with the control device 1000 to support the connection between a client device 1107 connected to the security cloud 1106 and the control device 1000. In another example, the gateway 1105 may be associated with the control device 1000 to support a connection between a third-party cloud 1108 connected to the security cloud 1106 and the control device 1000. However, the present disclosure is not limited thereto.

In various embodiments, the gateway 1105 may be utilized to connect the vehicle 1100 to a software management cloud 1109 for managing the operating software of the vehicle 1100. For example, the software management cloud 1109 may monitor whether the update of the operating software of the vehicle 1100 is required, and may provide data for updating the operating software of the vehicle 1100 via the gateway 1105 based on monitoring that the update of the operating software of the vehicle 1100 is required. As another example, the software management cloud 1109 may receive a user request requesting the update of the operating software of the vehicle 1100 from the vehicle 1100 through the gateway 1105, and provide data for updating the operating software of the vehicle 1100 based on the reception. However, the present disclosure is not limited thereto.

Hereinabove, the present disclosure has been described with reference to exemplary embodiments. All exemplary embodiments and conditional illustrations disclosed in the present disclosure have been described to intend to assist in the understanding of the principle and the concept of the present disclosure by those skilled in the art to which the present disclosure pertains. Therefore, it will be understood by those skilled in the art to which the present disclosure pertains that the present disclosure may be implemented in modified forms without departing from the spirit and scope of the present disclosure.

Therefore, the embodiments disclosed herein should be considered in an illustrative aspect rather than a restrictive aspect. The scope of the present disclosure should be defined by the claims rather than the above description, and equivalents to the claims should be interpreted to fall within the present disclosure.

Meanwhile, the methods according to various exemplary embodiments of the present disclosure described above may be implemented as programs and be provided to servers or devices. Therefore, the respective devices may access the servers or the devices in which the programs are stored to download the programs.

In addition, the methods according to various exemplary embodiments of the present disclosure described above may be implemented as programs and be provided in a state in which it is stored in various non-transitory computer-readable media. The non-transitory computer readable medium is not a medium that stores data for a while, such as a register, a cache, a memory, or the like, but means a medium that semi-permanently stores data and is readable by an apparatus. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the embodiments of the disclosure have been illustrated and described hereinabove, the disclosure is not limited to the specific embodiments described above, but may be variously modified by those skilled in the art to which the disclosure pertains without departing from the scope and spirit of the disclosure as claimed in the claims. These modifications should also be understood to fall within the technical spirit and scope of the disclosure.

DESCRIPTION OF REFERENCE NUMERALS
IN THE DRAWINGS

1000: driving video recording system
200: main body
100: camera

The invention claimed is:

1. A driving video recording system, comprising:
a camera that includes a capturing unit configured to capture a video, an event detection sensor configured to detect an event, and a camera connector configured to interface with a main body;
wherein the main body includes an image processing unit configured to receive and process an image captured by the capturing unit, a power supply unit configured to supply power for an operation of the driving video recording system, a control unit configured to control an operation of the power supply unit, and a main body connector configured to interface with the camera,
wherein the control unit controls the power supply unit to turn off the power supply to the capturing unit in a parking recording mode and to turn on the power supply to the event detection sensor,
wherein the power supply unit includes a first power supply unit and a second power supply unit, and
wherein the first power supply unit and the second power supply unit are configured to receive power from a battery of a vehicle in which the driving video recording system is installed.

2. The driving video recording system of claim 1, wherein the event detection sensor includes at least one of an impact event detection sensor and a motion event detection sensor.

3. The driving video recording system of claim 1, wherein the camera connector and the main body connector are connected to each other via a cable.

4. The driving video recording system of claim 1, wherein the camera and the main body are configured physically separately from each other.

5. The driving video recording system of claim 1, wherein a signal line of the capturing unit and a signal line of the event detection sensor are configured separately from each other.

6. The driving video recording system of claim 1, wherein the camera connector includes:
a first camera connector that interfaces data communication between the capturing unit and the image processing unit and interfaces power supply between the capturing unit and the first power supply unit; and
a second camera connector that interfaces power supply between the event detection sensor and the second power supply unit and interfaces data communication between the event detection sensor and the control unit.

7. The driving video recording system of claim 1, wherein the main body connector includes:
a first main body connector that interfaces data communication between the capturing unit and the image processing unit and interfaces power supply between the capturing unit and the first power supply unit; and
a second main body connector that interfaces power supply between the event detection sensor and the second power supply unit and interfaces data communication between the event detection sensor and the control unit.

8. The driving video recording system of claim 1, wherein in the parking recording mode, the control unit controls the power supply unit to turn off the power supply through the first power supply unit and turn on the power supply through the second power supply unit, and
the event detection sensor receives power from the second power supply unit through the second camera connector of the camera connector and the second main body connector of the main body connector to operate.

9. The driving video recording system of claim 8, wherein the power supply of the first power supply unit to the capturing unit and the image processing unit is cut off through the first camera connector of the camera connector and the first main body connector of the main body connector, and the capturing unit and the image processing unit do not operate.

10. The driving video recording system of claim 8, wherein when an event is detected by the operating event detection sensor, the event detection sensor transmits an interrupt to the control unit through the second camera connector and the second main body connector, and
the control unit receiving the interrupt controls the power supply unit to turn on the power supply through the first power supply unit.

11. The driving video recording system of claim 10, wherein when the capturing unit and the image processing unit are supplied with power from the first power supply unit through the first camera connector of the camera connector and the first main body connector of the main body connector,
the capturing unit and the image processing unit wake up and operate.

12. The driving video recording system of claim 11, wherein when the work of the capturing unit and the image processing unit is completed, the control unit controls the power supply unit to turn off the power supply through the first power supply unit.

13. A method for reducing current consumption of a driving video recording system, the driving video recording system including a camera that includes a capturing unit capturing a driving video, a parking event detection unit detecting an event during parking, and a first connector unit for connection to a main body; wherein the main body includes an image processing unit receiving and processing an image captured by the capturing unit, a power supply unit supplying power for an operation of the driving video recording system, a control unit controlling an operation of the power supply unit, and a main body connector for interfacing with the camera, the method comprising:
controlling the power supply unit to turn off the power supply to the capturing unit in a parking recording mode and to turn on the power supply to the event detection sensor, and
receiving, by a first power supply unit and a second power supply unit, power from a battery of a vehicle in which the driving video recording system is installed,
wherein the power supply unit includes the first power supply unit and the second power supply unit.

14. The method of claim 13, wherein the controlling includes controlling the power supply unit to turn off the power supply through the first power supply unit and turn on the power supply through the second power supply unit, and
further includes receiving, by the event detection sensor, power from the second power supply unit through a second camera connector of the camera connector and a second main body connector of the main body connector to operate.

15. The method of claim 14, further comprising:
cutting off the power supply of the first power supply unit to the capturing unit and the image processing unit through a first camera connector of the camera connector and a first main body connector of the main body connector, and not operating the capturing unit and the image processing unit.

16. The method of claim 14, further comprising:

when an event is detected by the operating event detection sensor, transmitting, by the event detection sensor, an interrupt to the control unit through the second camera connector and the second main body connector; and controlling, by the control unit receiving the interrupt, the power supply unit to turn on the power supply through the first power supply unit.

17. A non-transitory computer-readable recording medium on which a program for executing the method for reducing current consumption of a driving video recording system described in claim 13 is recorded.

\* \* \* \* \*